R. KLEIN & T. BRUECK.
PHOTOGRAPHIC SHUTTER.
APPLICATION FILED SEPT. 15, 1917.

1,280,240.

Patented Oct. 1, 1918.
2 SHEETS—SHEET 1.

INVENTORS:
Rudolph Klein and
Theodor Brueck
by Davis & Simms
their attorneys

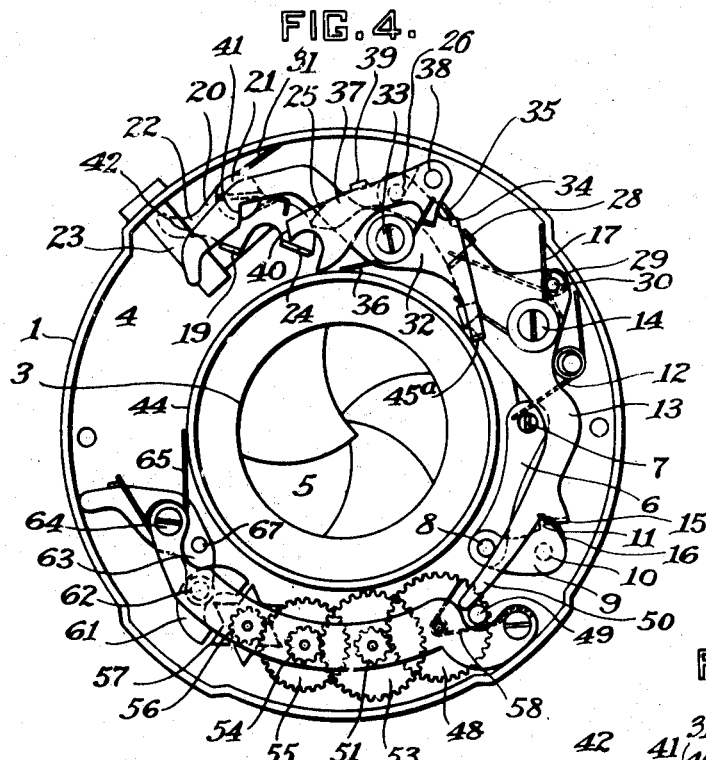
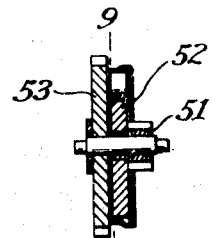
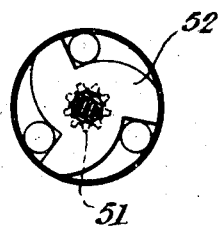
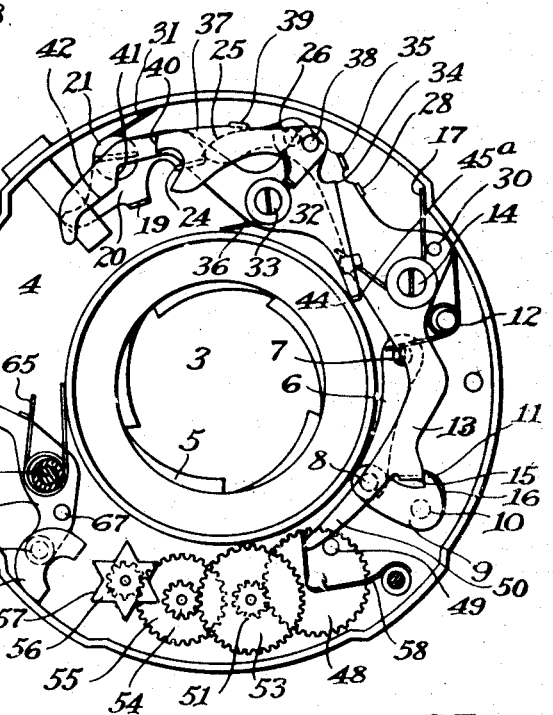
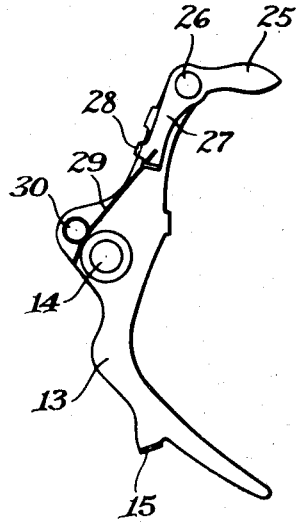

UNITED STATES PATENT OFFICE.

RUDOLPH KLEIN AND THEODOR BRUECK, OF ROCHESTER, NEW YORK, ASSIGNORS TO ILEX OPTICAL COMPANY, OF ROCHESTER, NEW YORK, A CORPORATION.

PHOTOGRAPHIC SHUTTER.

1,280,240.  Specification of Letters Patent.  Patented Oct. 1, 1918.

Application filed September 15, 1917. Serial No. 191,617.

*To all whom it may concern:*

Be it known that we, RUDOLPH KLEIN and THEODOR BRUECK, citizens of the United States, and residents of Rochester, in the county of Monroe and State of New York, have invented certain new and useful Improvements in Photographic Shutters, of which the following is a specification.

The present invention relates to photographic shutters and more particularly to the type in which a motor mechanism is employed for effecting the opening and the closing of the shutter, an object of this invention being to provide an improved motor member which will be more durable in use, thus giving greater life to the shutter. Another object of the invention is to improve the control of the retarding mechanism whereby the number of parts required will be reduced to a minimum.

To these and other ends the invention consists of certain parts and combinations of parts all of which will be hereinafter described, the novel features being pointed out in the appended claims.

In the drawings:—

Fig. 4 is an interior view with the controlling ring removed and the two retarding devices connected for contemporaneous action;

Fig. 5 is a view similar to Fig. 4, in which the shutter blades are open and one of the retarding devices is thrown out of action;

Fig. 7 is a detail view of the master or motor member;

Fig. 8 is a cross section of the clutch in one of the retarding devices; and

Fig. 9 is a section on the line 9—9, Fig. 8.

Figure 1:
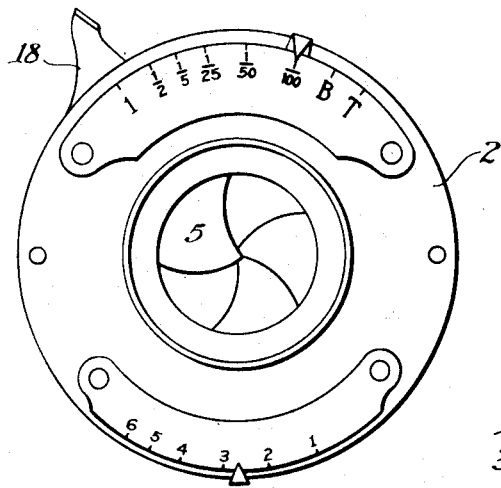
Figure 1 is a front view of a shutter constructed in accordance with this invention.
Figure 2:
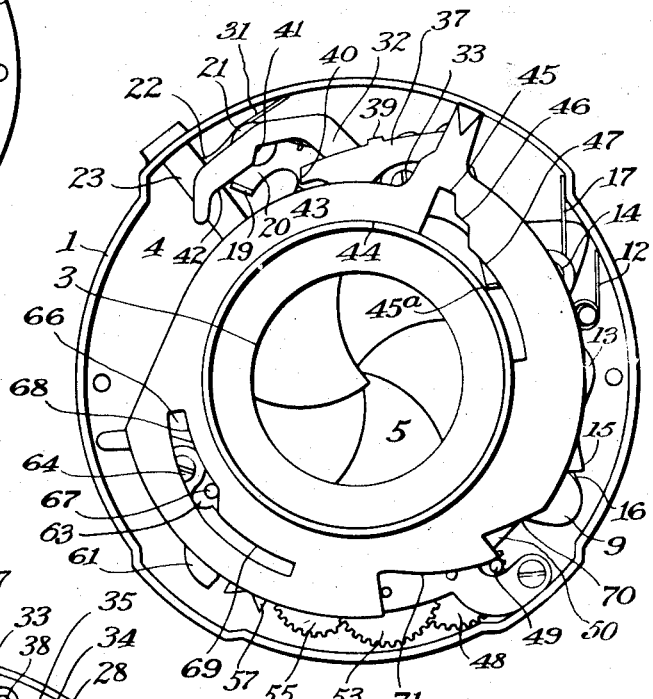
Fig. 2 is a view of the shutter with the front plate removed and the controlling ring adjusted to connect the two retarding devices.
Figure 3:
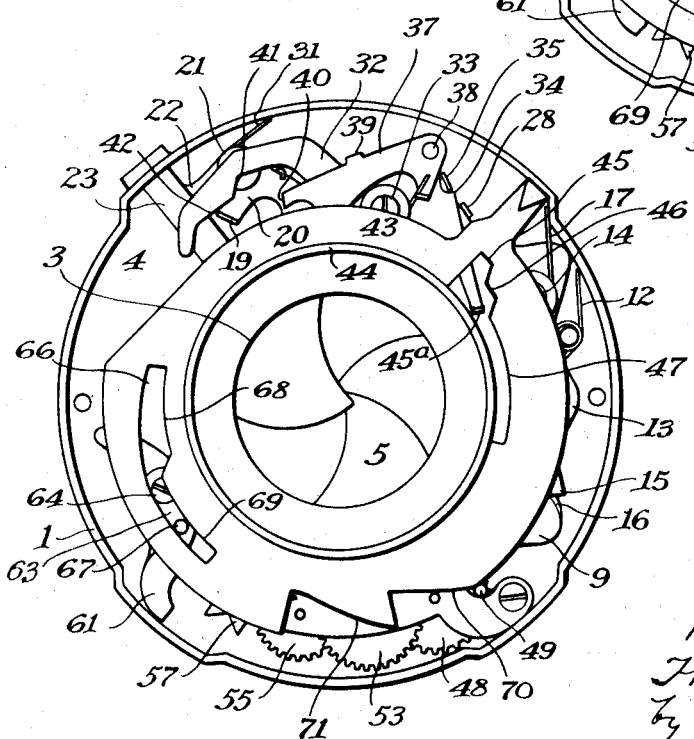
Fig. 3 is a view similar to Fig. 2, in which the controlling ring is adjusted to produce instantaneous exposure without retardation.
Figure 6:
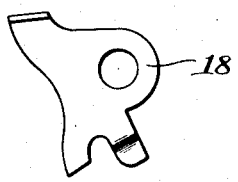
Fig. 6 is a detail view of the actuating member.

According to the illustrated embodiment of the invention, 1 indicates a casing having a removable cover-plate 2 and a central aperture 3 surrounded by an annular chamber 4. The aperture of the shutter is adapted to be closed by blades 5 mounted in any suitable manner, as, for instance, in the manner shown in our U. S. Letters Patent #1,215,-284, granted February 6, 1917. In the present embodiment a link 6 is connected by a pin 7 to the exposure ring of the shutter illustrated in the before-mentioned Letters Patent, and this link 6 is also connected pivotally at 8 to a lever 9 which is pivoted at 10 within the annular chamber 4 of the casing. The lever 9 has a nose 11 with which the motor mechanism of the shutter is adapted to engage for the purpose of effecting the opening of the shutter blades against the action of the spring 12, the motor mechanism freeing the lever 9 after a time to permit the blades to close under the action of said spring 12.

The motor mechanism may be of any suitable type, but in this instance it embodies a motor member of lever 13 pivotally mounted at 14 within the annular chamber 4, and having a laterally-deflected portion 15 which is adapted to engage with the nose 11 of the lever 9, said motor member being moved in one direction, riding over the nose 11, due to the inclined face 16 on said nose, so that no action of the shutter blades takes place during such movement of the motor member, but, upon the return movement of the motor member, under the action of the spring 17, in which power has been stored during the previous movement, the lateral projection 15 on the motor or master member 13 engages the nose 11 and effects the opening of the shutter blades, after which the projection 15 slips off the nose 11 due to the fact that the levers 13 and 9 turn on different pivotal centers, thus freeing the lever 9 and permitting the shutter blades to close under the action of the spring 12.

Any suitable means may be employed for moving the motor or master member 13 against the action of its spring 17. In this instance, the shutter is provided with an actuating lever 18 pivotally mounted on the rear face of the cover-plate 2 and adapted to engage with a lateral lug 19 on a lever 20, the latter being pivoted at 21 within the annular chamber 4 of the shutter casing. This lever 20 also has an arm 22 operating within a slot in a tube 23, in which the inner end of a cable or wire release, not shown, operates. The lever 20 also has a lateral projection 24 for coöperating with one arm 25 of a bell crank latch which is pivoted at 26 on the master or motor member 13, the other arm 27 of said bell crank latch having a lateral lug 28 which engages the master or motor member 13 to limit the movement of the latch in one direction, while permitting such movement in the other direction. A spring 29 secured at 30 on the master or motor member also operates on the arm 27 of the bell crank latch, in order to hold the stop shoulder 28 against the master or motor member 13, while at the same time permitting the bell crank latch to yield with reference to the master or motor member. By this arrangement, when the lever 20 is moved in one direction against the action of its spring 31, the lateral projection 24 of said lever engages the arm 25 of the bell crank latch, and through the shoulder 28 transmits motion to the master or motor member 13 to move the latter against the action of its spring 17. As the lever 20 and the master or motor member 13 move about different pivotal centers, a point will be reached when the arm 25 of the bell crank latch will slip off the projection 24, thus freeing the master or motor member 13 to the action of its spring 17, so that said master member, on its return movement, can effect the opening and the closing of the shutter blades without awaiting the return of the lever 20. When the lever 20 is freed, its projection 24 engages the arm 25 of the bell crank latch and moves said latch about the pivot 26 and relatively to the master or motor member 13, so that the return of the lever 20 is effected without affecting the master or motor member 13.

In shutters of this type, it is desirable to provide a detaining means acting on the master or motor member to hold the latter against action, while the blades are in open position. In this construction this is accomplished by a detent 32 pivoted at 33 and having a shoulder 34 adapted to be thrown into the path of a lateral shoulder 35. A spring 36 acts on this detent to throw the shoulder 34 into the path of the shoulder 35 on each actuation of the master or motor member, provided no means is brought into operation for preventing the action of the spring 36. Arranged on the detent 32 is a latch 37 pivoted at 38 on the detent and acted on by the spring 36. This latch has a lateral projection 39 lying in the path of the latch 25 on the master or motor member 13, and it also has a nose or shoulder 40 lying in the path of the lateral projection 19 on the lever 20 of the operating mechanism.

The operation of the shutter to produce time exposures is effected by moving the lever 20 to shift the master or motor member 13 through the latch 25, the said latch engaging the projection 39 on the latch 37 and shifting the shoulder 40 of the latch 37 out of the path of the projection 19, as will be seen by referring to Fig. 5 of the drawings. At the same time, the shoulder 34 on the detent is brought into the path of the shoulder 35 on the master member under the action of the spring 36, thus holding the shutter blades open. This brings the shoulder 41 in rear of the projection 19 on the operating lever 20, so that, when said operating lever is released, the projection 19 will engage the shoulder 41, thus preventing the return movement of the operating lever 20, while at the same time the shutter blades will be held open. Furthermore, the master member 13 will have moved a short distance on its return movement, thus freeing the latch 37 and permitting the shoulder thereon to fall in the path of the projection 19. To close the blades, the actuating or operating device of the shutter is again operated and the projection 19 of the operating lever 20 engages the shoulder 40 of the latch 37 and through said latch shifts the detaining member 32 in a direction to carry the shoulder 34 thereon out of the path of the shoulder 35 on the master or motor member.

Bulb exposure is obtained by controlling the detent 32 in such a manner that when the actuating devices are operated, the spring 36 will not move the shoulder 41 into the path of the projection 19 on the operating member 20, but when the actuating devices are released the projection 19 will engage the inclined surface 42 on the detaining member and in this way shift the shoulder 34 on the detaining member out of the path of the shoulder 35 of the master member permitting the shutter blades to close.

Instantaneous exposures are effected by holding the detaining member 32 so that it cannot move under the action of its spring 36 upon the movement of the master or motor member 13.

The control of the time and bulb detent may be effected in any suitable manner, as by a controlling body in the form of a ring 43 journaled on the lens barrel 44 of the shutter casing and having three surfaces 45, 46 and 47 thereon for engaging the projection 45ᵃ on the detent to effect, respectively, the time exposures, the bulb exposures, and the instantaneous exposures, the surface 47, or the one for effecting the instantaneous exposures, being elongated so that a larger movement of the ring 43 may take place in order that exposures of graded durations may be secured.

Automatically timed or graded exposures of great duration are obtained by retarding the action of the shutter when it is adjusted for instantaneous exposure. This retarding is effected by retarding mechanism which, in this instance, embodies two retarding devices, one acting through the other, and both being controllable through the annular or ring-shaped controlling body. In this instance, one of these retarding devices embodies an oscillatory gear 48 having a lateral pin 49 thereon adapted for engagement by an extension 50 on the master or motor member. This gear 48 meshes with a pinion 51, which, by a clutch 52, is connected to a gear 53 that connects with a pinion 54 on the gear 55, the latter meshing with a pinion 56 on a star wheel 57. A spring 58 acts on the gear 48 in a direction to maintain the pin or projection 49 on the gear 48 toward the extension 50 on the master or motor member. The clutch 60 permits this movement of the gear 48 under the action of the spring 58, without transmitting the motion of the gear to the train of gears, but when the gear 48 is engaged and moved by the projection 50 of the master or motor member, the entire train of gears will be brought into action, thus exercising a retarding influence of the master or motor member.

The secondary or auxiliary retarding device is, in this instance, in the form of an anchor 61 pivoted at 62 on the lever 63 which is, in turn, pivoted at 64 within the annular chamber of the shutter casing, a spring 65 acting on said lever 64 in order normally to hold the anchor in coöperation with the star wheel 57, so that said anchor may retard the rotation of the star wheel and thus produce an auxiliary or secondary retarding action.

Both of the retarding devices are controlled by the ring or annular member 43, which is provided with a cam slot 66 in which the projection 67 on the lever 63 operates, the cam slot having a surface 68 which permits the anchor 61 to coöperate with the star wheel 57 and also having a surface 69 which, through the projection 67, moves the anchor 61 against the action of the spring 65 out of coöperation with the star wheel 57. The annular member or ring 43 also has two cam surfaces 70 and 71 for coöperation with the lateral projection 49 on the oscillatory gear 48. The surface 70 limits and varies the movement of the projection 49 toward the arm or extension 50 on the master or motor member, when the anchor 61 is held out of coöperation with the star wheel 57, while the surface 71 limits and varies the movement of the projection 49 toward the extension 50 on the master or motor member, when the anchor 61 is arranged in coöperation with the star wheel 57.

It is apparent that, if the wheel 48 is permitted to move but a short distance under the action of the spring 58, then the retarding action imposed on the master or motor member will be smaller than if the projection 49 were given a greater range of movement. Furthermore, it will be apparent that the retarding action will be greater when the anchored device 61 is in coöperation with the star wheel 57 than when this coöperation is not effected.

What we claim as our invention and desire to secure by Letters Patent is:—

1. In a photographic shutter, a master member, a latch pivoted to the master member, an abutment limiting the movement of the latch in one direction, a spring acting on said latch to hold the latter to such limit of movement, and actuating devices for shifting said master member in one direction said actuating devices embodying a lever which engages said latch and then slips off said latch after the latter has been swung with the master member beyond the range of the actuating devices, the latch yielding on the return movement of the master member to pass the actuating devices.

2. In a photographic shutter having an apertured casing, a motor mechanism arranged in said casing, two retarding devices both for acting on the motor mechanism, one being adjustable and intermediate the other and the motor mechanism, and the other being adapted to be connected to and disconnected from the adjustable intermediate retarding device, and an annular member surrounding the aperture of the casing and having two surfaces for coöperating with the adjustable intermediate retarding device, one surface being operative when the two retarding devices are operative, and the other surface being operative when only the intermediate retarding device is operative, said annular member having also a surface for coöperating with the other retarding device to disconnect it from the intermediate retarding device when the second mentioned surface is operating.

3. A photographic shutter according to claim 2 in which the intermediate retarding device embodies a star wheel and the other retarding device is in the form of a pivoted anchor, combined with a spring-pressed pivoted lever on which the anchor is pivoted, said lever coöperating with the annular member.

RUDOLPH KLEIN.
THEODOR BRUECK.